United States Patent
Conway et al.

(10) Patent No.: US 7,189,447 B2
(45) Date of Patent: Mar. 13, 2007

(54) LAMINATES

(75) Inventors: Thomas J. Conway, White Bear Lake, MN (US); Janet R. Kirkman, Minneapolis, MN (US); Brian L. Koster, Mendota Heights, MN (US); Heather K. Kranz, Blaine, MN (US); Bruce E. Tait, Woodbury, MN (US); Einar O. Vaage, Stillwater, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/038,642

(22) Filed: Jan. 4, 2002

(65) Prior Publication Data

US 2003/0143371 A1    Jul. 31, 2003

(51) Int. Cl.
*B32B 3/10* (2006.01)
*B32B 3/14* (2006.01)
*B32B 3/16* (2006.01)
*G02B 1/10* (2006.01)

(52) U.S. Cl. .................... 428/136; 428/77; 428/78; 428/138; 359/580; 359/584

(58) Field of Classification Search ............ 428/77, 428/136, 138, 192, 212, 213, 220, 216, 426, 428/430, 432; 359/359, 380, 384, 580, 584
See application file for complete search history.

(56) References Cited

U.S. PATENT DOCUMENTS

| | | | | |
|---|---|---|---|---|
| 4,799,745 A | 1/1989 | Meyer et al. | ............... | 350/1.7 |
| 5,024,895 A * | 6/1991 | Kavanagh et al. | ............ | 428/437 |
| 5,103,337 A | 4/1992 | Schrenk et al. | ............ | 359/359 |
| 5,131,967 A * | 7/1992 | Tweadey, II et al. | ....... | 156/101 |
| 5,208,080 A * | 5/1993 | Gajewski et al. | .......... | 428/1.54 |
| 5,223,465 A | 6/1993 | Ueki et al. | ................... | 502/117 |
| RE34,605 E | 5/1994 | Schrenk et al. | ............ | 359/359 |
| 5,320,893 A | 6/1994 | Floyd | ......................... | 428/136 |
| 5,360,659 A | 11/1994 | Arends et al. | ............. | 428/216 |
| 5,882,774 A | 3/1999 | Jonza et al. | ................. | 428/212 |
| 5,980,666 A | 11/1999 | Roth et al. | .................. | 156/107 |
| 6,049,419 A | 4/2000 | Wheatley et al. | ........... | 359/359 |
| 6,157,490 A | 12/2000 | Wheatley et al. | ........... | 359/589 |
| 6,207,260 B1 | 3/2001 | Wheatley et al. | ........... | 428/212 |
| 6,352,754 B1 | 3/2002 | Frost et al. | .................. | 428/77 |
| 6,410,120 B1 | 6/2002 | Frost et al. | ................. | 428/174 |
| 6,538,192 B1 * | 3/2003 | Coster et al. | ............... | 136/251 |

(Continued)

FOREIGN PATENT DOCUMENTS

DE    19902471    8/2000

(Continued)

*Primary Examiner*—Rena Dye
*Assistant Examiner*—Patricia L Nordmeyer
(74) *Attorney, Agent, or Firm*—Harold C. Knecht, III

(57) ABSTRACT

A transparent optical film laminate and a method of making such a laminate. The laminate can include a transparent optical sheet comprising a non-metallic multi-layer optical film sandwiched between first and second bonding sheets. The optical sheet and the bonding sheets are also sandwiched between two glazing components. A substantial portion of the peripheral edge of the optical film lies within or beyond the peripheral edge of at least one of the glazing components. The peripheral edge of the optical film may have a portion that lies within and a portion that lies beyond the peripheral edge of at least one of the glazing components.

41 Claims, 5 Drawing Sheets

U.S. PATENT DOCUMENTS 6,582,809 B2 * 6/2003 Boire et al. .................. 428/216
6,811,867 B1 * 11/2004 McGurran et al. .......... 428/323

FOREIGN PATENT DOCUMENTS

| | | |
|---|---|---|
| EP | 0724955 | 8/1996 |
| WO | WO91/19586 | 12/1991 |
| WO | WO98/12583 | 3/1998 |
| WO | 0 978 736 | 9/2000 |
| WO | WO01/96104 | 12/2001 |

* cited by examiner

LAMINATES

FIELD OF THE INVENTION

This invention relates to transparent laminates and methods of making the same. More particularly, the present invention relates to laminates useful in architectural or vehicular window structures.

BACKGROUND

Conventional automotive or architectural glazing or window structures often include a laminate typically made of two rigid glass or plastic sheets and an interlayer of plasticized polyvinyl butyral (PVB). The glazing is prepared by first placing a PVB layer between the two rigid sheets. The PVB layer is typically sized and positioned so as to either extend beyond or be flush with the periphery of the two rigid sheets. Air is then eliminated from the engaging surfaces, and the assembly is then subjected to elevated temperature and pressure (e.g., in an autoclave) to fusion bond the PVB and the rigid sheets into a laminate suitable for use in the window structure. After the rigid sheets are bonded together, any excess PVB extending out beyond the periphery of the rigid sheets is typically trimmed off. Such laminates have been used for automotive and architectural glazing applications.

These laminates have also included a functional sheet engineered to enhance the performance of the resulting glazing. One such functional sheet is designed to reflect infrared radiation (IR) away from the interior of a building or vehicle cabin. An example of such an IR reflective sheet can be found in U.S. Pat. Nos. 5,882,774, 6,049,419, 5,103,337, 5,223,465, 5,360,659 and 4,799,745. In the forming of a laminate suitable for a glazing or window structure, such a functional sheet is typically bonded between two sheets of glass using two sheets of PVB, with one sheet of PVB being used to bond one of the glass sheets to each side of the functional sheet.

SUMMARY OF THE INVENTION

A number of challenges have been encountered by the applicants in making a laminate suitable for a window structure using an optical sheet comprising a non-metallic multi-layer optical film (e.g., an IR reflective film). A useful multi-layer optical film can include a stack of 100 or more optical layers. Through empirical studies, it has been found that such optical films can exhibit interlayer delamination (i.e., delamination between the multiple optical layers) to the point of adversely affecting the optical performance of the film, as well as being an aesthetic defect. This delamination initiates at the peripheral edge of the optical film. Without intending to be bound by any theory, it is believed that this delamination is caused by the stresses that can be placed on the film during lamination processing (e.g., during autoclaving or other bonding operations). Such stresses during the laminating process may be caused, for example, by one or more of shrinkage of the optical film, imprecise cutting of the optical film, voids at the peripheral edge of the optical film and the comparative curvature of the glazing component(s) used.

The above described problem of film delamination has been solved by the present invention. In one aspect of the present invention, a laminate is provided that comprises, in an intermediate form, a first bonding sheet and a transparent optical sheet. The first bonding sheet is suitable for bonding to a glazing component (e.g., transparent plastic or glass sheeting suitable for use as a window). The transparent optical sheet comprises a non-metallic multi-layer optical film. A major surface of the optical sheet and a major surface of the first bonding sheet are at first positioned, and subsequently at least partially bonded, together. It may be desirable for at least a substantial portion of the peripheral edge of the optical film to lie within the peripheral edge of the first bonding sheet. In other words, it may be desirable for at least a portion of the peripheral edge of the optical film to be disposed so as to be flush with, or even extend beyond, a portion of the peripheral edge of the first bonding sheet, without departing from this aspect of the present invention. It can be preferred that the entire optical film of this embodiment lie within the peripheral edge of the first bonding sheet.

The optical film is dimensioned so as to be positionable substantially within the peripheral edge of the glazing component(s) to which the optical sheet is to be adhered. In other words, it may be desirable for the optical film to be dimensioned so that a portion of its peripheral edge is positioned so as to extend beyond, or even be flush with, a portion of the peripheral edge of the glazing component, while the remaining portion of the peripheral edge of the optical film lies within the peripheral edge of the glazing component. For example, one or more portions of the peripheral edge of the glazing component, to which the optical film is bonded, may be masked or otherwise hidden from view. In such a case, the appearance of a delamination on the peripheral edge of the optical film, such as those caused by positioning a portion of the peripheral edge of the optical film flush with a portion of the peripheral edge of the glazing component, may be acceptable.

It can be preferable for the optical film to be dimensioned so as to be positionable completely within the peripheral edge of the glazing component to which the optical sheet is to be adhered. It can also be preferred that at least a substantial portion of the peripheral edge of the optical film be disposed so as to extend beyond the peripheral edge of one or both of the glazing components. What is to be avoided, in an effort to eliminate delamination of the optical film, is to have significant portions of the peripheral edge of the optical film (i.e., those portions where delamination is unacceptable) disposed so as to be flush with the peripheral edge of one or both glazing components, before the optical sheet, bonding sheets and glazing components are fully bonded together in the laminating process. The bonding sheet is used to adhere the optical sheet to a major surface of the glazing component. Preferably, the optical sheet is positioned so as to be at least generally co-planar with this major surface of the glazing component.

In addition, the peripheral edge of the optical film can be a first peripheral edge and the optical film can include one or more second peripheral edges (e.g., one or more holes formed through the optical film) located within the confines of the first peripheral edge. Likewise, the peripheral edge of the glazing components, and if desired the bonding sheets, can be a first peripheral edge and the glazing components, and if desired the bonding sheets, can include one or more second peripheral edges (e.g., one or more holes formed through the glazing components and, if desired the bonding sheets) located within the confines of the first peripheral edge. It can be desirable for each second peripheral edge of the optical film to be positionable substantially within a corresponding second peripheral edge of the glazing component(s) to which the optical sheet is to be adhered. The term "substantially within" has the same meaning as used above regarding the peripheral edges of the optical film and the glazing component.

Similarly, when there is one or more second peripheral edges, it can be desirable for a substantial portion of each second peripheral edge of the optical film to be disposed so as to extend beyond a corresponding second peripheral edge of one or both of the glazing components. It can also be desirable for the glazing components to have one or more second peripheral edges and the optical film not to have corresponding second peripheral edges until after the final laminating processes. That is, the second peripheral edges of the optical film can be formed after the glazing components, the bonding sheets and the optical sheet are all laminated together.

In a further intermediate form, the laminates of the present invention also comprise a second bonding sheet having a major surface that is at least positioned next to, or at least partially bonded to, the other major surface of the optical sheet such that the optical sheet is disposed between the first bonding sheet and the second bonding sheet. It can be preferable for the optical film to lie completely within the peripheral edge of at least one of the first bonding sheet and the second bonding sheet. One or both of the first and second bonding sheets can comprise any suitable bonding material including a material selected from the group consisting of polyvinyl butyral, polyurethane, ionomer materials, and combinations thereof and may be initially transparent or may become transparent later in the lamination process. Examples of suitable ionomer materials may include the ionoplast interlayer used in the DuPont laminated glass products marketed under the trademark designation Sentry-Glas® Plus, as well as other ionomer-class materials such as the ionomer resins marketed by DuPont under the trademark designation Surlyn®.

In an alternative embodiment of the intermediate laminate, the laminate further comprises a transparent peripheral strip that once formed an outer peripheral portion of the optical sheet. The peripheral strip comprises non-metallic multi-layer optical film and is disposed beyond the peripheral edge of the optical sheet. The inner peripheral edge of the peripheral strip and the peripheral edge of the optical sheet define a slit therebetween. Once formed, the peripheral strip can either be left in place or removed. When the two bonding sheets are present, it can be desirable for the slit to go through the optical sheet and through the first or the second bonding sheet.

In a final form, the laminate further comprises two transparent glazing components. Each of the glazing components can be made, for example, of such materials as glass, plastic or a combination thereof. Each glazing component can be in the form, for example, of a flat sheet, a curved sheet, a compound curved sheet, a lens, vary in thickness (e.g., have a decorative surface topography), etc. Each of the first bonding sheet and the second bonding sheet has a major surface that faces the major surface of one or the other of the glazing components such that the optical sheet is disposed between the first and second bonding sheets and the first and second bonding sheets are disposed between the glazing components. Once a final bonding operation has been performed, each of the first and second bonding sheets is fully bonded to its respective glazing component and the optical sheet.

Preferably, each of the first and second bonding sheets is bonded to its respective glazing component and the optical sheet, and at least one of the first and second bonding sheets is bonded to the peripheral edge of the optical sheet such that there are substantially no voids (i.e., that any voids present do not function as delamination nucleation sites) present adjacent the peripheral edge of the optical sheet. It can be desirable for the optical film to be positioned completely within the peripheral edge of one, and preferably both, of the glazing components. It can also be desirable for at least a portion, and preferably most or all, of the peripheral edge of the optical film to be disposed so as to extend beyond the peripheral edge of one, and preferably both, of the glazing components. It can also be desirable for a portion of the peripheral edge of the optical sheet to lie within the peripheral edge of one or more of the glazing components and, at the same time, another portion of the peripheral edge of the optical sheet extend beyond the peripheral edge of one or more of the glazing components.

In another aspect of the present invention, a method is provided for making a laminate embodiment, in an intermediate form, for use in a window structure. The method comprises providing the first bonding sheet and the transparent optical sheet. The first bonding sheet is suitable for bonding to the optical sheet and to a glazing component. The method also comprises dimensioning the optical sheet and the first bonding sheet such that all or a substantial portion of the peripheral edge of the optical film can lie within the peripheral edge of the first bonding sheet and such that the optical film is positionable completely or substantially within the peripheral edge of a glazing component to which the first bonding sheet is to be adhered. The dimensioning of the optical sheet and any bonding sheet can occur in one or a number of operations, and these operations can occur simultaneously or in a sequence. The method further comprises positioning together one major surface of the optical sheet so as to face one major surface of the first bonding sheet such that a substantial portion of the peripheral edge of the optical film lies within the peripheral edge of the first bonding sheet.

The method of the present invention can further comprise at least partially bonding together the one major surface of the optical sheet and the one major surface of the first bonding sheet such that a substantial portion of the peripheral edge of the optical film lies within the peripheral edge of the first bonding sheet. The dimensioning can be performed after such at least partially bonding together.

The optical sheet being provided can form part of a pre-dimensioned transparent optical sheet, and the dimensioning step can comprise trimming a peripheral portion or strip of the pre-dimensioned transparent optical sheet, at least the non-metallic multi-layer optical film, to form the peripheral edge of the optical sheet. Preferably, this is a precisely trimming operation so as to substantially limit the formation of sites for subsequent delamination of the multi-layer optical film along the peripheral edge of the optical film. It may be desirable to remove the peripheral portion, after the positioning together step. The term "precisely trimming" refers to trimming such as, for example, with at least one of a laser, a sharp blade, a die (e.g., steel or rule), an abrader, a burring tool or an ultrasonic horn so as to significantly reduce, if not eliminate, ragged edges, roughcut edges, cracks or other such defects in the peripheral edge of the multi-layer optical film, which produces a site for subsequent film delamination, after further processing of the laminate (e.g., laminating to the glazing component(s)).

It is desirable for the peripheral strip to be disposed beyond the peripheral edge of the optical film. It can be desirable for this trimming to be performed after the at least partially bonding together. It can also be desirable for the trimming operation to comprise forming a slit through the optical sheet. When the two bonding sheets are present, it can be desirable to form the slit through the optical sheet and through the first bonding sheet or the second bonding sheet.

As the making of the present laminate progresses, the method further comprises providing the second bonding sheet, which is also suitable for bonding to the optical sheet and a glazing component, and positioning together the other major surface of the optical sheet and one major surface of the second bonding sheet such that a substantial portion of the peripheral edge of the optical film lies within the peripheral edge of the second bonding sheet and the optical sheet is disposed between the first and second bonding sheets. The method can further comprise at least partially bonding together the other major surface of the optical sheet and the one major surface of the second bonding sheet such that a substantial portion of the peripheral edge of the optical film lies within the peripheral edge of the second bonding sheet and the optical sheet is disposed between the first and second bonding sheets.

In a later phase of the present inventive method, two transparent glazing components are provided, and the method also comprises positioning together the other major surface of the first bonding sheet and the major surface of one of the glazing components and positioning together the other major surface of the second bonding sheet and the major surface of the other one of the glazing components, such that the first and second bonding sheets are disposed between the glazing components. In one embodiment, the method can further comprise positioning the optical sheet such that a substantial portion of the peripheral edge of the optical film lies within the peripheral edge of at least one, or more, of the glazing components. It can also be desirable for the positioning of the optical sheet to comprise positioning the peripheral edge of the optical film completely within the peripheral edge of at least one, or more, of the glazing components by a distance. When the peripheral strip is present, the method can comprise positioning together the major surface of each of the glazing components with the other major surface of one or the other of the first and second bonding sheets, such that the optical sheet and the peripheral strip are disposed between the first and second bonding sheets and the first and second bonding sheets are disposed between the glazing components.

In an alternative embodiment of the method of making a laminate for use in a window structure, the method can comprise dimensioning the optical sheet so that the peripheral edge of at least one, and preferably both, of the glazing components is positionable substantially within the peripheral edge of the optical film. That the peripheral edge of at least one, or both, of the glazing components is positionable substantially within the peripheral edge of the optical film indicates that it may be desirable for one or more portions or lengths of the peripheral edge of the optical film to be dimensioned so as to be positionable within, or even flush with, the peripheral edge of one or more of the glazing component(s). This method also comprises positioning the optical sheet between the first and second bonding sheets, positioning the first and second bonding sheets between the glazing components, and positioning the optical sheet such that all, or at least a substantial portion, of the peripheral edge of the optical film lies beyond the peripheral edge of at least one, or more, of the glazing components. This method further comprises bonding together each of the major surfaces of the bonding sheets with the respective major surfaces of the optical sheet and the glazing components.

As it progresses, the present method further comprises: at least partially bonding together the one major surface of the optical sheet and the one major surface of the first bonding sheet; at least partially bonding together the other major surface of the optical sheet and the one major surface of the second bonding sheet; at least partially bonding together the other major surface of the first bonding sheet and the major surface of the one glazing component; and at least partially bonding together the other major surface of the second bonding sheet and the major surface of the other glazing component, wherein the optical sheet is bonded between the first and second bonding sheets and the first and second bonding sheets are bonded between the glazing components.

At the end of the laminating process, the present method preferably comprises applying at least heat, or heat and pressure, to the laminate for a sufficient time to allow the major surfaces of the first and second bonding sheets to flow and sufficiently bond to the respective major surfaces of the optical sheet and the glazing components. When the peripheral strip is present, the method can comprise applying at least heat, or heat and pressure, for a sufficient time to allow a gap between the peripheral strip and the optical sheet to substantially fill with a portion of at least one of the first and the second bonding sheets.

After the final bonding operation, this method can also comprise trimming at least that portion of the optical sheet that is located beyond the peripheral edge of the one or more glazing components such that the resulting peripheral edge of the optical film is at least about flush with the peripheral edge of the at least one or more glazing component. It can be desirable for the optical film, before the final bonding operation, to be dimensioned so as to extend at least about 0.8 mm, and preferably in the range of from about 0.8 mm to about 13 mm, beyond the peripheral edge of at least one, or more, of the glazing components.

In an additional aspect of the present invention, a kit is provided for making a laminate. The kit comprises the first bonding sheet and the transparent optical sheet. The major surfaces of the optical sheet and the first bonding sheet are positionable together such that a substantial portion of the peripheral edge of said optical film lies within the peripheral edge of the first bonding sheet. The optical film is dimensioned so as to be positionable substantially within the peripheral edge of the glazing component to which the optical sheet is to be adhered. The kit can also include the second bonding sheet. The major surface of the second bonding sheet is positionable relative to the other major surface of the optical sheet such that the optical sheet can be disposed between the first and second bonding sheets. The kit can further comprise two transparent glazing components. The other major surface of each of the first and second bonding sheets is positionable so as to face the major surface of one or the other of the glazing components such that the optical sheet can be disposed between the first and second bonding sheets and the first and second bonding sheets can be disposed between the glazing components.

Thus, it is desirable to protect the peripheral edge of the optical film from the stresses that may cause delamination of the optical film during or after the laminating process. In this effort, the bonding sheet material can be used so as to absorb such delamination stresses. This can be accomplished by having a substantial portion of the peripheral area of both glazing components (i.e., that area of each glazing component that extends beyond the peripheral edge of the optical film) bonded together directly through the bonding sheet material. This can also be accomplished by having a substantial portion of the peripheral edge of the optical film extend beyond the peripheral edge of both glazing components. In this way, the stresses are applied through a portion of the optical film other than the peripheral edge of the optical film (i.e., a portion located within the boundary defined by the peripheral edge of the optical film). When the optical film lies within one glazing component and extends beyond the other glazing component, at least some of such stresses may still be diverted from the peripheral edge of the optical film.

Definitions

As used herein, the following terms and phrases are intended to have the following meanings:

"transparent" refers to a characteristic of material that allows at least some amount of light to pass therethrough;

"delamination" is indicative of mechanical separation and/or a loss of bond;

"fully bonded" means that surfaces are in adherent contact with each other and cannot be separated, with only mechanical force, without damaging at least one of the bonded surfaces.

BRIEF DESCRIPTION OF THE DRAWINGS

Like reference symbols in the various drawings generally indicate like elements.

DETAILED DESCRIPTION OF THE PREFERRED EMBODIMENTS

The present invention provides laminates that are prepared so as to at least reduce the likelihood of, if not eliminate, significant delamination along a peripheral edge of an optical sheet comprising a non-metallic multi-layer optical film (e.g., an IR reflective film). Methods of making these laminates that are useful in window structures are also provided.

A number of challenges have been encountered by the applicants in making a laminate suitable for a window structure using an optical sheet comprising a non-metallic multi-layer optical film (e.g., an IR reflective film).

Figure 1:
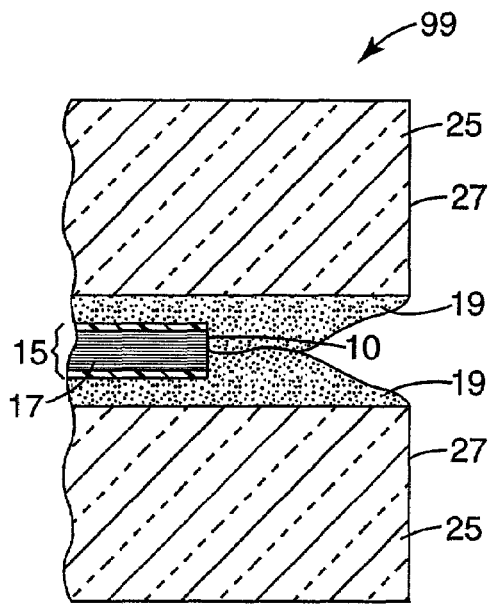
FIG. 1 is a sectional view of the peripheral edge of a laminate according to the present invention.
Figure 2A:
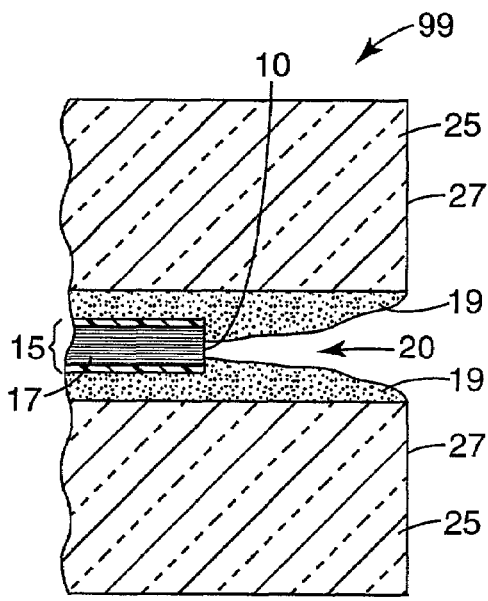
FIG. 2A is a sectional view of the peripheral edge of a laminate exhibiting void formation resulting from optical sheet shrinkage.
Figure 2B:
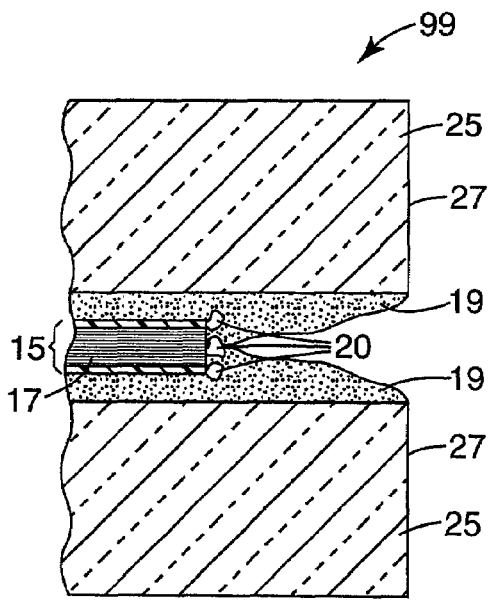
FIG. 2B is a sectional view of the peripheral edge of a laminate exhibiting another type of void formation.

For example, referring to FIG. 1, a window laminate 99 according to the present invention can include an optical sheet 15, having a non-metallic multi-layer optical film 17 with a peripheral edge 10. The sheet 15 is sandwiched between two bonding sheets 19 that, in turn, are sandwiched between two glazing components 25, in a layered manner so as to bond the optical sheet therebetween. The peripheral edge 10 of the optical sheet 15 is depicted as having retracted or shrunk away from its original position where it was once flush with the peripheral edge 27 of the two glazing components 25. One or more voids 20 can result from such shrinkage. Examples of such void formation are depicted in FIGS. 2A and 2B. Besides being aesthically unpleasant, void 20 or a plurality of such voids can also be a site for liquids, particles, contaminants and other debris to collect at and possibly infiltrate the layers of the optical film 17 (e.g., see FIG. 2A). Over time this may weaken the bond between the layers of the optical film 17 and affect the functionality of the glazing assembly 99.

It has been found that the use of conventional methods of making glazing laminates can also cause an optical sheet to experience high shear and out-of-plane stresses that can result in delamination within the multiple layers of the optical film. Delamination within the multiple layers of the optical film can further result in other defects such as "sunbursts" or "wormy patterns."

Further delamination producing defects can also be caused in the optical film during one or more of the de-airing, oven heating (tacking) and autoclave steps of conventional laminating processes for glazings. Problems that can occur during such processing can include, for example, fractures formed at the edge of the optical film when it is cut using a mechanical means (e.g., razor cutting on a plotter table). When the optical film is put under stress, the fractures can propagate to cause interlayer delamination of the optical film. Fractures may be considered as part of a larger class of defects, called "sites for subsequent delamination." These sites can generate problems after certain lamination processing steps such as, for example, one or more of deairing, being subjected to elevated temperature and/or pressure, etc.

When an optical sheet is made into an automotive windshield using conventional techniques, the optical sheet is sandwiched between two bonding sheets (e.g., two pieces of PVB, etc.) and two glazing components (e.g., two sheets of glass and/or plastic, etc.). The optical sheet, or at least the optical film, is then trimmed flush with the entire peripheral edge of the two sheets of glass. An autoclave step, or similar process, is often used next to fully bond (i.e., the last bonding step) this windshield laminate together. During autoclaving, which is typically conducted at a temperature of about 140° C. and a pressure of about 12 bar, the optical film tends to shrink and conform to the curvature of the glass. However, as the optical film shrinks and pulls away from the peripheral edge of the glass, a portion of one or both of the bonding sheets can be pulled along with it. This pulling action can lead to visible defects at the peripheral edge of the glass such as, for example, voids. Again, these defects can also lead to delamination of the optical film.

The laminates of the present invention have components that are dimensioned and positioned so that the peripheral edge of the optical film is minimally susceptible to, if not free of, delamination. The primary components included in a final laminate according to the present invention are two bonding sheets, for bonding a transparent optical sheet between two glazing components.

Glass sheeting is a preferred glazing component, especially for vehicle window structures. There are of course, other substantially clear materials that can be used as glazing components to provide rigidity and strength to an optical sheet. These alternative materials include polymeric materials such as, for example, acrylic, polyethylene teraphthalate (PET) or polycarbonate. A glazing component can be substantially planar or have some curvature. It can be provided in various shapes, such as a dome, conical, or other configuration, and cross-sections, with a variety of surface topographies. The present invention is not intended to necessarily be limited to the use of any particular glazing component material(s) or structure.

A glazing component that has some curvature may be particularly prone to exhibiting delamination along a peripheral edge of the optical film. This can be due to the stresses imposed on the optical film that force the film to fit to a curved surface. Stresses resulting in delamination may also arise if glazing component pairs are misaligned or misshaped, or if a glaze component is poorly handled during the lamination processing.

Suitable optical sheets comprise a non-metallic multilayer optical film such as, for example, that described in U.S. Pat. Nos. 6,207,260; 6,157,490; 6,049,419; 5,882,774; 5,360,659; 5,223,465; and 5,103,337 (RE 34,605) and in PCT Publications Nos. WO 99/36248 and WO 01/96104, and U.S. Patent Application Ser. No. 60/261942, entitled MULTILAYER INFRARED REFLECTING FILM WITH HIGH AND SMOOTH TRANSMISSION IN VISIBLE WAVELENGTH REGION AND LAMINATE ARTICLES MADE THEREFROM and filed Jan. 15, 2001, all of which are incorporated herein by reference in their entirety. Suitable optical sheets of the present invention may include, but are not necessarily limited to, infrared reflecting films, polarized films, non-polarized films, multi-layer films, colored or tinted films, and decorative films.

A bonding sheet is used to bond together an optical sheet and a glazing component. In preferred laminates and glazing structures, the bonding sheet is a polymeric film, such as an energy or shock dissipating layer. These types of films can assist in bonding the glazing component to the optical sheet, as well as impart a protective feature (e.g., anti-spall, anti-lacerative), a feature often desired for vehicular glazings (e.g. windshields and sideglass). Suitable materials for the bonding sheet can include for example, films made from polyvinylbutyral (PVB), an ionoplast, or polyurethane. Commercially available bonding sheets include those, for example, from E.I. DuPont deNemours, Co., (Wilmington, Del.) under the trade designation BUTACITE (PVB); from Solutia Inc. (St. Louis, Mo.) under the trade designation SAFLEX (PVB); from Sekisui Chemical Co. Ltd (Osake, Japan) under the trade designation S-LEC (PVB); from H.T. Troplast (Troisdorf, Germany) under the trade designation TROSIFOL (PVB); from E.I. DuPont deNemours, Co., (Wilmington, Del.) under the trade designation SENTRY GLAS PLUS (ionoplast); and from Huntsman Polyurethanes (Morton) and available through Polymar bvba, Brasschaat, Belgium under the trade designation KRYSTALFLEX (polyurethane).

Alternative bonding sheets may also include, for example, a layer or coating of an adhesive or tape. The bonding sheet may be substantially continuous, or partially discontinuous. The bonding sheet is preferably provided in a sufficient amount to form a bond between an optical layer and a glazing component. The present invention is not intended to necessarily be limited to the use of any particular bonding sheet material(s) or structure.

Figure 3:
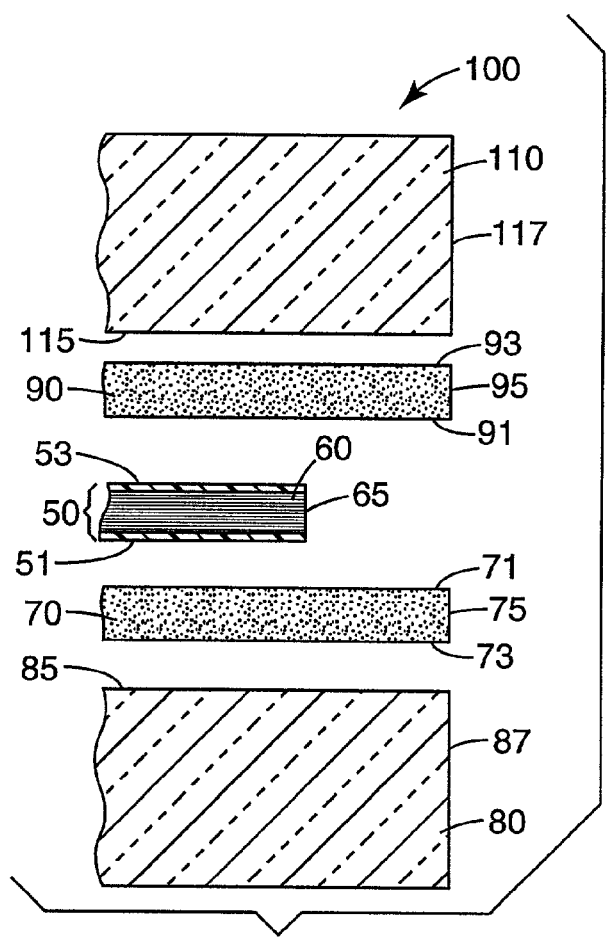
FIG. 3 is an exploded sectional view of the peripheral edge of a laminate according to the present invention, before being finally bonded together.

It has been surprisingly found that laminates having certain dimensional configurations can be provided such that a particular configuration and dimensioning of the components can eliminate, or at least significantly reduce, edge delamination of the optical film by eliminating, or at least significantly reducing, the application of high tensile stress, high shear stress or both along the peripheral edge of the optical film. Thus, in an exemplary embodiment of the invention, as shown in FIG. 3, a laminate 100 is provided where a peripheral edge 65 of an optical film 60 (of an optical sheet 50) is dimensioned so as to be positionable substantially within, and preferably completely within, the peripheral edge 75 of a bonding sheet 70. Opposing major surfaces 51 and 71 of the optical sheet 50 and the bonding sheet 70 can be at least partially bonded to each other in a layered manner so as to form an intermediate laminate. In this embodiment, the peripheral edge 65 of the film 60 is dimensioned so as to be positionable substantially within the peripheral edge 87 of a glazing component 80 to which it is intended to be adhered to via bonding sheet 70. It can be preferable for peripheral edge 65 of the optical film 60 to be dimensioned so as to be positionable, completely within peripheral edge 87 of glazing component 80. It may be desirable for part or all of the peripheral edge 75 of the bonding sheet 70 to be flush with or extend beyond the peripheral edge 87 of the glazing component 80 to which it is to be bonded. In another intermediate laminate, optical sheet 50 is sandwiched between two bonding sheets, where the major surfaces 51 and 53 of the optical sheet 50 are at least partially bonded to respective opposing major surfaces 71 and 91 of the bonding sheet 70 and a second bonding sheet 90. In this intermediate embodiment, the peripheral edge 65 of the optical film 60 is dimensioned and positioned substantially within, and preferably completely within, both of the peripheral edges 75 and 95 of bonding sheets 70 and 90. Also in the exemplary embodiment of laminate 100, the peripheral edge 65 of the film 60 is dimensioned so as to be positionable substantially within, and preferably completely within, the peripheral edge 117 of the glazing component 110 to which it is intended to be adhered to via bonding sheet 90. It may be desirable for part or all of the peripheral edge 95 of the bonding sheet 90 to be flush with or extend beyond the peripheral edge 117 of the glazing component 110 to which it is to be bonded. In the laminate 100, major surfaces 73 and 93 of the bonding sheets 70 and 90 are to be bonded to respective opposing major surfaces 85 and 115 of glazing components 80 and 110.

Figure 4:
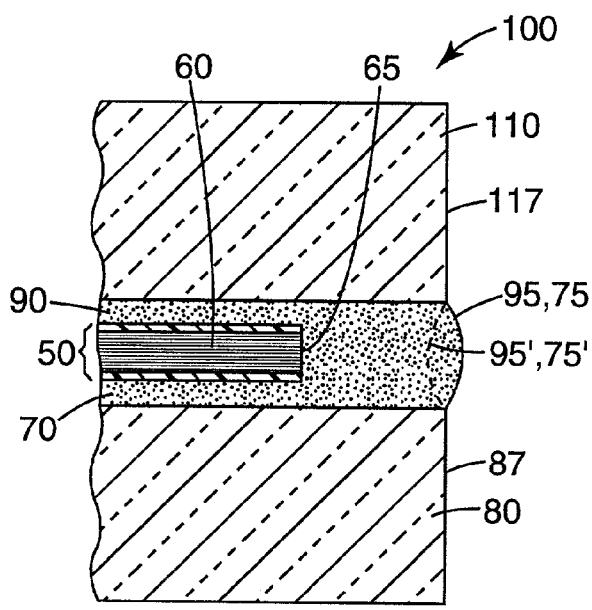
FIG. 4 is a sectional view of the laminate of FIG. 3 having been fully bonded together.

Thus, in the construction of the laminate 100, optical sheet 50 is positioned between first and second bonding sheets 70 and 90, and sheets 70 and 90 are positioned between glazing components 80 and 110, as described above. As shown in FIG. 4, when optimal performance of the laminate 100 is sought, in a window structure (e.g., a window frame of an automobile), it is preferable for the bonding sheets 70 and 90 to be fully bonded to their respective glazing components 80 and 110 as well as to optical sheet 50. After the laminate 100 is fully bonded together, a portion or all of the peripheral edge 95/75 of the resulting bonding sheet material 70 and 90 may extend out beyond one or both of the peripheral edges 87 and 117 of the glazing components 80 and 110. Alternatively, a portion or all of the peripheral edge 95'/75', shown in phantom, of the resulting bonding sheet material 70 and 90 may lie within one or both of the peripheral edges 87 and 117 of the glazing components 80 and 110. After forming of the laminate 100, e.g., after final bonding, any bonding sheet material extending beyond the glazing components 80 and 110 can be trimmed flush with the peripheral edges 87 and 117, as desired.

Figure 5:
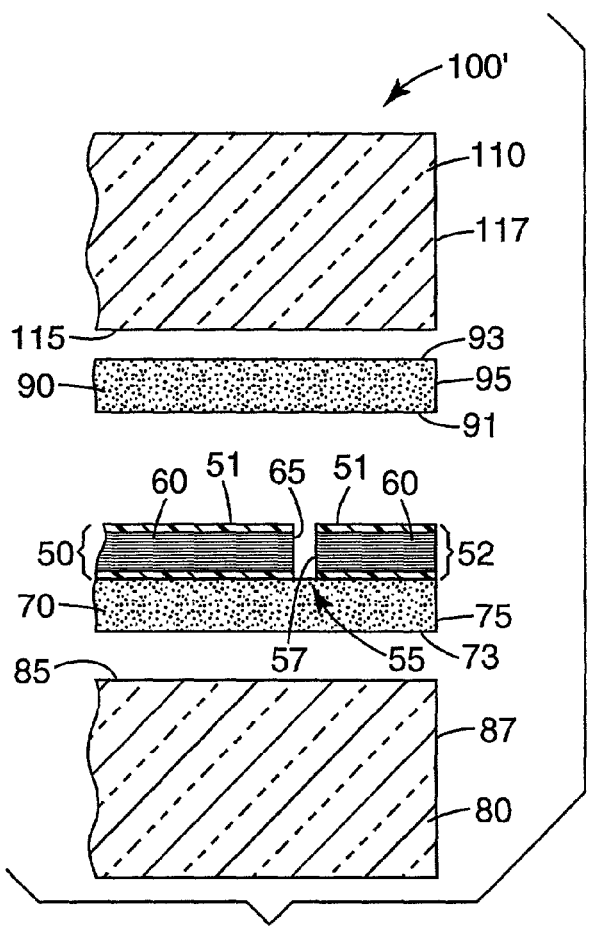
FIG. 5 is a partially exploded sectional view of the peripheral edge of an alternative laminate according to the present invention.
Figure 6:
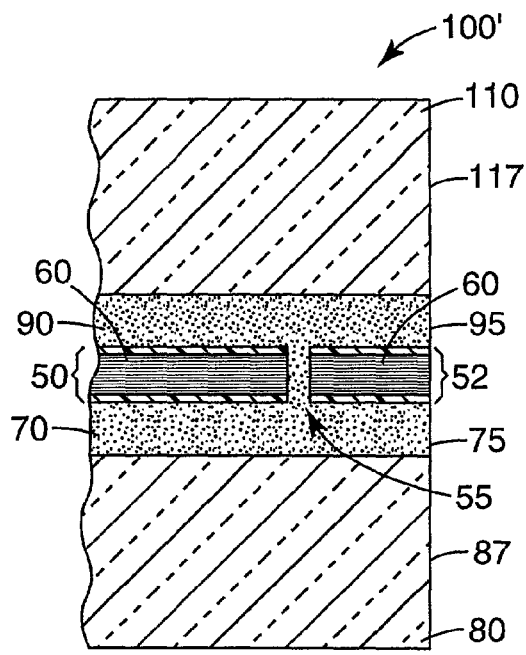
FIG. 6 is a sectional view of the laminate of FIG. 5 having been fully bonded together.

Referring to FIGS. 5 and 6, in another embodiment of the invention, the laminate 100 (hereafter referred to as laminate 100') includes a pre-dimensioned optical sheet 51 that comprises a peripheral portion or strip 52 that has been trimmed or otherwise separated from the optical sheet main body 50, both of which comprise a nonmetalic multi-layer optical film 60. The strip 52 is located adjacent to the peripheral edge 65 of the optical sheet main body 50. The strip 52 is formed around a substantial portion, or preferably all, of the optical sheet 50. In one intermediate laminate made with the optical sheet 51 being at least partially bonded to the bonding sheet 70, the strip 52 can be formed by, for example, cutting through a peripheral portion of the optical sheet 51 so as to make a slit 55. It may be desirable for the strip 52 to be removable from the bonding sheet 70, because removal of the strip 52 may be desired in order to make the laminate 100. In another intermediate laminate made with the optical sheet 51 being at least partially bonded between the bonding sheets 70 and 90, the slit 55 can be formed by, for example, cutting through both the bonding sheet 90 and the optical sheet 51. In such a case, it is preferred that the strip 52 not be removed.

Slit 55 is depicted as being defined by inner peripheral edge 57 of optical film strip 52 and outer peripheral edge 65 of optical sheet body 50. It can be desirable for slit 55 to be located a distance in the range of from about 5 mm to about 15 mm inward from the peripheral edges 87 and 117 of the glazing components 80 and 110. The glazing components 80 and 110 are added as part of the laminate 100' and bonded to their adjacent bonding sheets 70 and 90, both of which are bonded to optical sheet 50. Typically, the components of the laminate 100' are fully bonded together by the application of heat, preferably along with pressure. Laminate 100' is, preferably, subjected to a sufficiently elevated temperature and, preferably, pressure to cause the optical sheet 50 to shrink and slit 55 to open (see FIG. 6) and fill with softened material from one or both bonding sheets 70 and 90. During such a bonding operation, with the strip 52 being flush with the peripheral edges 87 and 117, the strip 52 can be exposed to levels of stress that are high enough to cause delamination of the optical film 60 in strip 52. Because the slit 55 separates the strip 52 from the optical film 60 of body 50, the optical film 60 of the main body 50 is isolated and protected from such delamination. It is to be understood that the slit 55 may be formed to only substantially, and not completely, separate the strip 52 from the film 60. For example, the slit 55 may be formed only through the film 60 of the optical sheet 51 and not completely through the sheet 51. In addition, it may not be necessary to completely eliminate delamination of the film 60 in body 50. Such delamination may be tolerable, for example, if it would not be visible when the laminate 100' is installed into a window structure. Therefore, it may not be necessary for the slit 55 to be formed so as to completely separate the film 60 of body 50 from the strip 52. That is, the film of strip 52 may remain attached to the film 60 of body 50 in those portions of the laminate 100' that will not be visible.

The foregoing embodiments can be especially useful in laminates where a glazing component has some curvature. By positioning the optical film to be substantially within the peripheral edges of the glazing components, the amount of curvature to which the optical film is subjected may be reduced, and film deformations (e.g. wrinkling) due to temperature differentials can be reduced or eliminated. In addition, as previously noted, the optical sheet 50 may shrink during thermal processing. During such processing, bonding material from one or both bonding sheets 70 and 90 can flow and fill in the area previously occupied by the portion of the retracted optical sheet 50, as shown in FIGS. 4 and 6. Allowing the bonding material to at least substantially, if not completely, surround the peripheral edge 65 of the optical sheet 50 helps to distribute the forces on the optical film 60, thereby lowering the probability of delamination.

Figure 7:
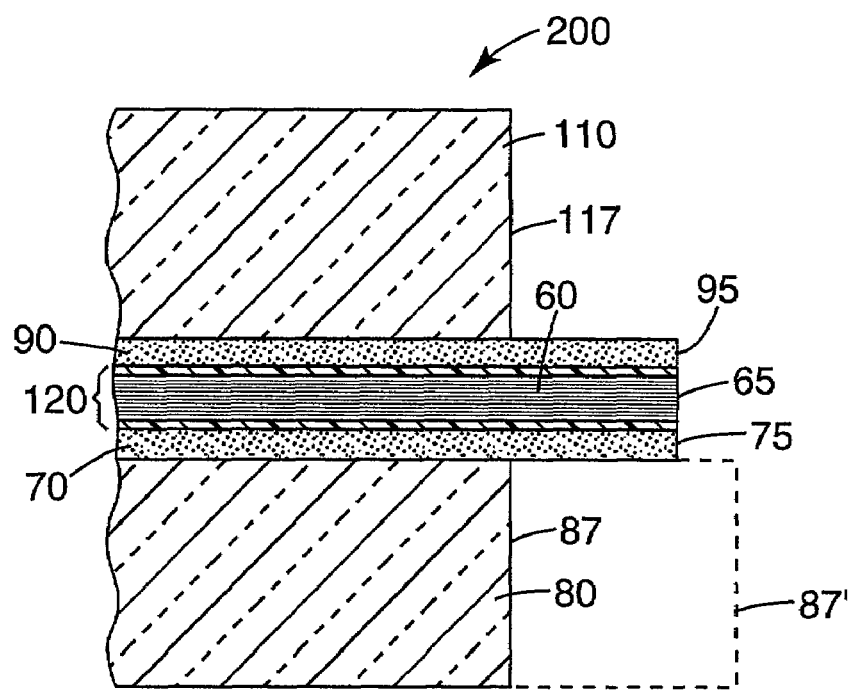
FIG. 7 is a sectional view of the peripheral edge of another laminate according to the present invention.

Referring to FIG. 7, in an alternative embodiment of the invention, the laminate (hereafter referred to as laminate 200) includes two transparent glazing components 80 and 110, two bonding sheets 70 and 90, and a transparent optical sheet 120 comprising a non-metallic multi-layer optical film 60. The laminate 200 is configured so that at least a substantial portion, and preferably all, of peripheral edge 65 of film 60 extends a sufficient amount beyond the peripheral edge 87 and/or 117 of at least one, and preferably both of the glazing components 80 and 110 so as to minimize the stress that may be applied to the peripheral edge 65 of film 60 during the operation(s) used in bonding the laminate 200 together. It is desirable to dimension the optical film 60 so that it extends at least about 0.8 mm beyond the peripheral edge of the glazing component. Preferably, the optical film extends less than about 13 mm beyond the edge of the glazing component. However, the amount of extension can be modified, and is preferably determined, by taking a number of factors into account such as, for example, the size of the glazing components, the extent of glazing component curvature, how much the optical sheet tends to shrink and the conditions at which bonding of the laminate is conducted.

In certain instances, it may be desirable for the laminate 200 to be made with one glazing component 80 having a peripheral edge, as indicated in phantom by reference number 87', that extends beyond the peripheral edge 117 of the second glazing component 110. It may also be desirable for the optical sheet 120 used in such a laminate 200 to be dimensioned such that the peripheral edge 65 of at least the optical film 60 is flush with, lies substantially within or lies completely within the peripheral edge 87' of the one glazing components 80 and extends substantially beyond, or preferably completely beyond, the peripheral edge 117 of the other glazing component 110. Preferably, the portions of the bonding sheets 70 and 90 and the optical sheet 120 that extend beyond the peripheral edge 117 of the glazing component 110 are then removed or at least prevented from bonding to the area of the glazing component 80 that extends beyond the first glazing component 110.

Figure 8:
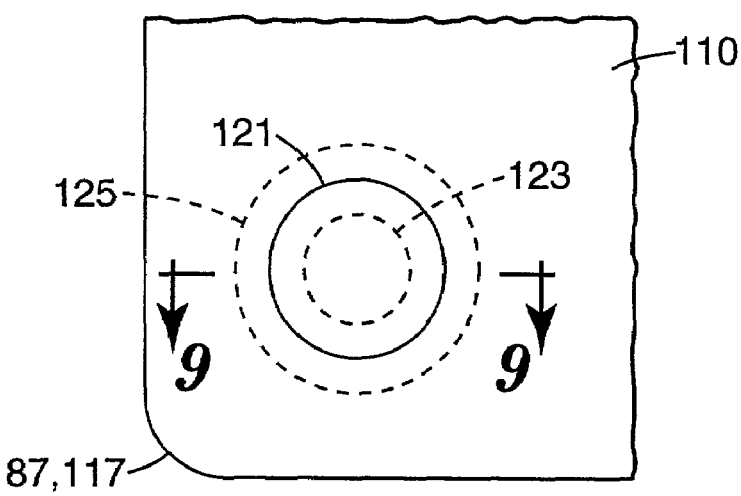
FIG. 8 is a plane view of a corner of a laminate, according to the present invention, showing an inner peripheral edge within an outer peripheral edge.
Figure 9:
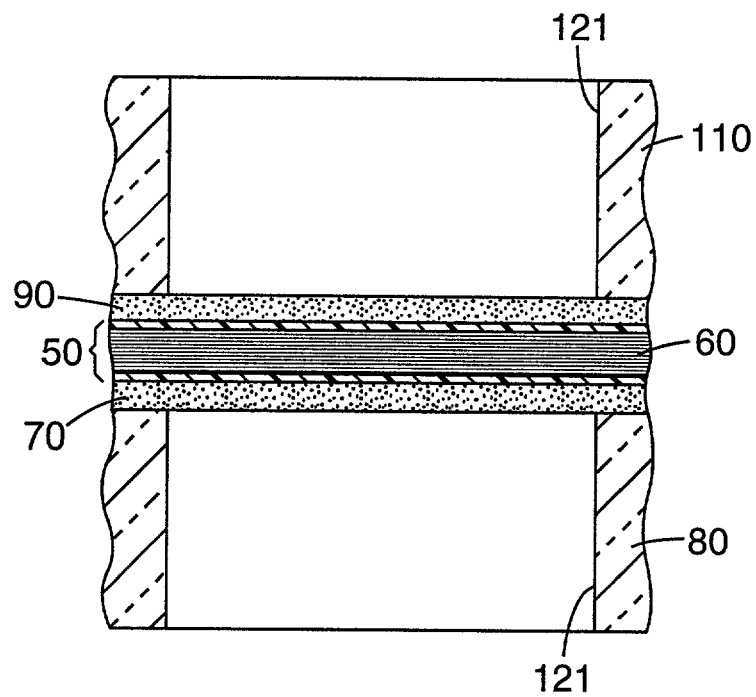
FIG. 9 is a sectional view of the laminate of FIG. 8 taken along lines 9—9.

Referring to FIGS. 8 and 9, any of the laminates according to the present invention may be made such that the glazing components 80 and 110 include, within their outer or first peripheral edges 87 and 117, one or more inner or second peripheral edges 121. The peripheral edge 121 can define, for example, a hole formed through one or both glazing components 80 and 110. Such holes 121 can be used for a number of application such as, for example, to attach the laminate within the window structure (e.g., an automobile sideglass to a doorframe) or to facilitate the attachment of ancillary structure (e.g., a rear windshield wiper in an automobile like a wagon or minivan). The second peripheral edge of the glaze component may be formed before, during or after the laminate is bonded together or after the laminate is installed in its intended window structure. In such a laminate, the optical sheet 50 or 120 (and optical film 60) and the bonding sheets 70 and 90 each include a corresponding second peripheral edge. For example, it may be desirable for this second peripheral edge to be a hole flush with hole 121 that is formed in the optical sheet 50 or 120 and bonding sheets 70 and 90 before, during or after the laminate is bonded together or after the laminate is installed in its intended window structure. It may also be desirable for the second peripheral edge to lie substantially within, or preferably completely within, the second peripheral edge 121 of the glaze component, as indicated in phantom by reference number 123 in FIG. 8. It may further be desirable for the second peripheral edge to extend substantially beyond, or preferably completely beyond, the second peripheral edge 121 of the glaze components 80 and 110, as indicated in phantom by reference number 125. In addition, the second peripheral edge of the optical sheet 50 or 120 and bonding sheets 70 and 90 can be formed before or after the laminate is at least sandwiched together or, preferably, after the laminate is bonded together.

A method of making a laminate according to the present invention includes: providing a bonding sheet and a transparent optical sheet; dimensioning the optical sheet such that a substantial portion, and preferably all, of the peripheral edge of at least the optical film lies within that of the bonding sheet and is positionable at least substantially, and preferably completely, within the peripheral edge of a glazing component to which the bonding sheet will be adhered; and positioning the optical sheet to face the bonding sheet and preferably allow at least a substantial portion, and preferably all, of the optical film to lie within the peripheral edge of the bonding sheet. The opposing surfaces of the laminate components are all preferably at least partially bonded together.

In another method of the invention, a laminate is made by first providing two bonding sheets, a transparent optical sheet and two glazing components. The bonding sheets, optical sheet, and glazing components each have two major surfaces and a peripheral edge. The optical sheet comprises a non-metallic multi-layer optical film, also having a peripheral edge. The optical sheet is dimensioned so that the peripheral edge of at least one, and preferably both, of the glazing components is positionable substantially, and preferably completely, within the peripheral edge of the optical film. The optical sheet is positioned between the two bonding sheets and the glazing components so that a substantial portion, and preferably all, of the peripheral edge of at least the optical film lies beyond that of at least one, and preferably both, glazing components. The bonding sheets are bonded to corresponding adjacent surfaces of the glazing components and the optical sheet at elevated temperature and, preferably, pressure.

Alternatively, before bonding the components of the laminate, at least the optical film of the optical sheet is dimensioned so that it extends at least about 0.8 mm beyond the peripheral edge of at least one, and preferably both, glazing components. Preferably, the optical film extends less than about 13 mm beyond the edge of a glazing component. Optionally, after the laminate is fully bonded together, the method of the invention can further comprise trimming at least the portion of the optical sheet that is located beyond the peripheral edge of the one or both glazing components so that the peripheral edge of at least the optical film is at least about flush with the peripheral edge of the one or both glazing components.

It has been found that the use of precisely trimming tools and/or techniques to form the peripheral edge of at least the optical film in the present laminates can result in products with reduced occurrences of edge defects that can lead to sites for subsequent delamination. In a preferred method of the invention, use of a cutting tool such as a laser, die (e.g., steel or rule), pneumatic swivel blade, ultrasonic horn, etc. can provide sufficiently precise cuts that minimize the opportunity of the optical film to delaminate. Thus, it is preferable that the optical sheet be precisely trimmed using such tools and/or techniques to substantially limit the formation of sites for subsequent delamination of the optical film. A preferred laser is a 10.6 μm $CO_2$ laser, available from Eurolaser (Hamburg, Germany) and LMI (Somerset, Wis.). Suppliers that provide suitable ultrasonic horns include Sonic and Materials, (Newton, Conn.) and Dukane (St. Charles, Ill.). A plotter table such as those supplied by Aristomat (Hamburg, Germany) or Zund (Altstatten, Switzerland) can also be used in the trimming operation.

In another alternative method, the bonding of the laminate, such as in an autoclave cycle, can be adapted to reduce the occurrence of voids in the bonding sheet material and/or delamination in the optical film. For example, laminates like that shown in FIG. 7 and discussed above, where at least a substantial portion of the peripheral edge of the optical film extends beyond the peripheral edge of at least one and preferably both of the glazing components, can be bonded (e.g., autoclaved) at a lower peak temperature (e.g., in the range of from about 121° C. and about 127° C. for PVB bonding sheets). By doing so, the peripheral edge of the optical film may not retract as much as when it is exposed to higher temperatures, and can be designed to retract only as far as the peripheral edge of the glazing component(s), i.e., so that the edges are flush. As a further alternative, the time an assembled laminate is exposed to the peak bonding (e.g., autoclave) temperature and the total time that the laminate assembly is subjected to elevated temperature and, preferably, pressure (e.g., in the autoclave) can be increased to minimize the formation of voids in the bonding sheet material and/or delamination in the optical film. For example, in a preferred embodiment of an autoclave cycle, where the bonding sheets are PVB, the laminate can be exposed to an hour of peak temperature, as compared to prior methods that heat a laminate for about 20 to 30 minutes. In addition, for such a laminate, a total of 3 hours in an autoclave is preferred, as compared to traditional methods of 1 to 1.75 hours total autoclave time. By prolonging the bonding operation, it has been found that a bonding sheet such as, for example, PVB film is more likely to flow and fill in the spaces where the peripheral edge of the optical film or optical sheet had shrunk or retracted.

Laminate components can be exposed to elevated temperature for a sufficient time to allow the bonding sheet to soften, thereby creating a bond between the optical sheet and the glazing components. Preferably, the bonding sheet is subjected to sufficient heat that the sheet is able to flow and fill in gaps, such as a slit formed in the optical sheet, like the slit 55 shown in FIGS. 5 and 6. In practicing methods of the invention using PVB bonding sheets, lamination can be conducted at elevated temperatures in the range of from about 121° C. to about 177° C. Pressure can optionally be applied to the components in combination with elevated temperature. A preferred range for the pressure can be from about 10.3 bar to about 17.2 bar.

An example of a laminate after being subjected to a bonding operation of at least heat and, preferably, pressure is depicted in FIGS. 4 and 6. As seen in these Figures, bonding sheets 70 and 90 have softened and flowed together to create a seal-like border around at least a substantial portion, if not all, of the peripheral edge 65 and, preferably, encapsulating the entire optical sheet 50. The bonding sheet material can fill in the space (e.g., the space defined by slit 55) that optical sheet 50 created upon shrinking. This "fill-in" can make a more visually appealing edge, can provide a seal around optical sheet 50 and can even seal the peripheral edge of the optical sheet 50 from elements that may cause delamination of the optical film 60.

Optionally, a sealant such as a polyurethane composition, can be applied around the peripheral edge of the laminate, either before or after the final lamination process.

The laminates of the invention can be cut, shaped, or otherwise sized for use in architectural or vehicle window structures. Particularly useful applications of the inventive laminates are in vehicular glazing structures such as for example, backlights, sidelights, and windshields. In vehicular windshields, the laminate can optionally be designed so that the edge of the functional component or the edge of a prelaminate lies within a darkened area known as the "frit." A frit is typically applied on the surface of a windshield. A common frit pattern is a solid black border around the periphery of the windshield. A preferred design is a pattern that starts as a solid black pattern at the peripheral edge of the windshield and gradually becomes a pattern of smaller dots as the distance from the peripheral edge of the windshield increases. Placing the peripheral edge of an optical sheet and/or its optical film within the frit design "hides" the peripheral edge to provide an aesthetically pleasing product.

One or both surfaces of an optical sheet used in the laminates of the present invention may be modified to enhance their adhesion to the bonding sheets. Suitable techniques may include, for example, corona treatment, plasma treatment, flame treatment, etching, use of organic or inorganic primers, or any other suitable surface modifying techniques.

Test Methods

Observing Wrinkles

Windshields were inspected for wrinkles by viewing the laminates (using an unaided eye) at a distance of about 0.3–0.9 meter in reflected light. Fluorescent bulbs were used as the light source. The windshield was viewed at a 45-degree angle as well as horizontally, looking at the outside surface of the windshield as if it were installed in a vehicle. Any visible wrinkles were considered unacceptable.

Observing Voids

Windshields were inspected for voids by viewing the edge of the glass at a distance of 0.3–0.9 meter in transmitted light (using an unaided eye). Fluorescent bulbs were used as the light source. The windshield was viewed horizontally, looking at the outside surface of the windshield as if it were installed in a vehicle.

Observing Delamination

Windshields were inspected for delamination by viewing the peripheral edge of the optical sheet at a distance of 0.3–0.9 meter in transmitted light (using an unaided eye). Fluorescent bulbs were used as the light source. Each windshield was viewed vertically, looking at the outside surface of the windshield as if it were installed in a vehicle. Any visible delamination (mechanical separation) between layers was considered unacceptable.

EXAMPLES

In the examples, the following items were used and were referred to as noted:

| | |
|---|---|
| TYZOR ™ TPT | a tetraisopropyl titanate (TPT) primer, available from E. I. DuPont deNemours & Co. (Wilmington, DE) |
| SAFLEX AR 11 | 0.38 mm polyvinyl butyral (PVB) available from Solutia Inc., (St. Louis, MO) |
| SRF | Solar Reflecting Film (SRF), a multi-layer optical film made by Minnesota Mining and Manufacturing Company.* |
| Autoclave | Scholz Maschinenbau GmbH & Co. KG (Coesfeld, Germany) or Melco Steel Inc. (Azusa, California) |

*In accordance with the teachings of one or more of U.S. Pat. Nos. 5,360,659 and 6,157,490, PCT Publications Nos. WO 99/36248 and WO 01/96104, and U.S. patent application Ser. No. 60/261942.

Typically, the PVB does not become sufficiently transparent until after being heated to the point of fully bonding to the SRF and its corresponding glazing component. In addition, each pair of glazing components used to make a windshield were made of glass and generally equal in size (i.e., the peripheral edge of one did not extend substantially beyond the peripheral edge of the other).

Example 1

Eleven windshields were prepared with SRF that was coated with a DuPont Tyzor TPT prime coating. The SRF had a shrinkage 1.4% MD (machine direction) and 1.9% TD (transverse direction) measured at 150° C., 15 minutes in air (based on ASTM D1204-94).

Using one clear and one solar glass glazing component (i.e., glass tinted with iron oxide), each 2.3 mm thick, laminates were then prepared in a clean room by placing one sheet of 0.38 mm PVB (SAFLEX AR11), then a sheet of SRF and a final sheet of PVB over the inside glass glazing component. The outside glass glazing component was set over the PVB/SRF/PVB composite and a hook razor blade was used to trim off the excess PVB and SRF portions that extended beyond the peripheral edges of the glass glazing components. The laminates were then de-aired using a vacuum ring process. The laminates were de-aired at room temperature for approximately 11 minutes, then passed through a tacking oven (Quick Steel Oven modified by Curvlite) set at approximately 149° C. for 13–14 minutes. Through both the room temperature de-airing and tack stages, a vacuum of 0.76 bar was pulled. The laminates next were placed in an autoclave (Melco Steel Inc.). The peak temperature and pressure of the autoclave were 143° C. and 11.7 bar.

The rate of delamination (i.e., the number of windshields that showed delamination, out of the total samples) was tabulated and is shown in Table 1.

TABLE 1

Rate of Delamination using a Standard Cutting Method

| Windshield | Extension | Cutting Method | Rate of Delamination |
|---|---|---|---|
| SUV-size* w/SRF | None | Blade | 3/10 |
| SUV-size, PVB only** | None | Blade | 0/1 |

*Sport Utility Vehicle (SUV)*
**Sample contained two 0.38 mm sheets of PVB and no SRF Example 2

Eight windshields shaped to fit a sports coupe vehicle were prepared with a functional component, SRF, that was treated with DuPont TYZOR TPT prime coating. The SRF had a shrinkage of 1.4% MD and 1.4% TD, measured at 150° C., 15 minutes in air (based on ASTM D1204-94).

Prior to lamination the SRF was first pre-laminated to a 0.38 mm plastic interlayer of polyvinyl butyral, SAFLEX™ AR11 PVB using a ProTech ORCA IV laminator (DeForrest, Wis.), equipped with nip rollers. The lamination process was performed at room temperature with a roll pressure in the range of from about 0.35–0.70 bar and a line speed in the range of from approximately 25–30 mm/sec.

The prelaminates were then cut to shape using a swivel blade method on an ARISTOMAT 1625 cutting table. A CAD (computer-assisted design) file of each windshield was used to generate the cut patterns. The film on the bilaminates was cut in the pattern of the frit on the windshield. A CAD file was generated by tracing the frit pattern on the corresponding vehicle's windshield. The cutting was done at the edge of the solid frit so that after autoclaving the film edge would shrink in to the dotted frit.

The standard head pressure was set at 16 (no units) which allowed the blade to only cut through the 50.8 μm of SRF and only slightly into the PVB beneath. After cutting the SRF to the frit pattern, the film from the edge of the bilaminate to the cut was removed and the bilaminate was cut from the roll into a sheet. The bilaminate was cut on an ARISTOMAT 1625 cutting table using an ARISTO knife type 7750 on a standard head. The cutting speed was 300 mm/sec.

The cut pre-laminates were then laminated into the windshields with a second sheet of Saflex AR11 PVB. The PVB that extended beyond the glass was trimmed flush with the glass. Glass substrates, each 2.3 mm thick, were used to prepare the laminates inside a clean room. The laminates were de-aired using a vacuum ring process at room temperature for approximately 11 minutes, then passed through an oven (Quick Steel modified by Curvlite) set at 149° C. for 13–14 minutes. Through both the room temperature and heated stages, a vacuum of 0.8 bar was pulled. The laminates were placed in an autoclave (Scholz Maschinenbau GmbH & Co. KG) with a peak temperature and pressure of 140° C. and 13 bar.

Table 2 below summarizes the windshield lamination results of this Example 2:

TABLE 2

Rate of Delamination

| Cutback | Rate of Delamination |
|---|---|
| To frit | 0/8 |

Example 3

Twenty-nine SUV-sized windshields were generated with SRF that was coated with DuPont TYZOR™ TPT prime coating. The SRF had a shrinkage of 1.4% MD and 1.9% TD measured at 150° C., 15 minutes in air (based on ASTM D1204-94).

The SRF was prelaminated to 0.38 mm thick sheet of PVB (SAFLEX AR11). Trilaminates of PVB/SRF/PVB were made using a ProTech ORCA IV laminator (DeForrest, Wis.). In this prelamination process, the SRF and PVB were nipped together at room temperature through two nip rolls where one roll had a pressure of 6.9 bar and the other at 2.8 bar; line speed was approximately 40 mm/sec.

The prelaminates were then cut to shape using either a laser or pneumatic swivel blade method. A CAD file of the SUV-sized windshield was used to generate the cut pattern. The CAD file was adjusted so that the finished prelaminate would extend 3.2 mm beyond the edge of the glass.

The laser cut samples were generated at Laser Machining Inc. (LMI; Somerset, Wis.) using a 500 J/s $CO_2$ laser at 25% power with the focus set at the top surface.

The pneumatic swivel blade cut samples were generated on an ARISTOMAT 1625 cutting table using an ARISTO knife Type 7132.

The cut prelaminates were then placed between glass substrates each 2.3 mm thick and laminated into windshields. The laminates were prepared in a clean room. The windshields were de-aired using a vacuum ring process, performed at room temperature for approximately 11 minutes, then passed through a tacking oven (Quick Steel modified by Curvlite) set at approximately 149° C. for 13–14 minutes. Through both the room temperature de-airing and tack stages, a vacuum in the range of from about 0.76 bar–0.90 bar was pulled. The laminates (windshields) were next placed in an autoclave (Melco Steel Inc.). The peak temperature and pressure of the autoclave were about 143° C. and 11.7 bar.

The rate of delamination for all the samples was observed and tabulated, the results of which are shown in Table 3.

TABLE 3

Rate of Delamination using an Extension with Alternative Cutting Methods

| Extension | Cutting Method | Rate of Delamination |
|---|---|---|
| +3.2 mm | Laser | 0/12 |
| +3.2 mm | ARISTOMAT Cutting Table w/blade | 0/17 |

Example 4

Eight windshields were generated with SRF that was coated with DuPont TYZOR™ TPT prime coating. The SRF had a shrinkage of 1.4% MD and 1.4% TD measured at 150° C., 15 minutes in air (based on ASTM D1204-94).

The SRF was prelaminated to two sheets of 0.38 mm thick PVB (SAFLEX AR11) using a ProTech ORCA IV laminator (DeForest, Wis.). In this prelamination process, the SRF and PVB were nipped together at room temperature through two nip rolls where one roll had a pressure of 6.9 bar and the other at 2.8 bar. The line speed was approximately 40 mm/sec.

The prelaminates were then cut to shape using a pneumatic swivel cutting blade process. The CAD file was adjusted so that the finished prelaminate would extend 2.4 mm beyond the peripheral edge of the two glass glazing components. A second modification to the CAD file was made to generate a pre-laminate with a cut 10 mm in from the peripheral edge of the glass glazing components or 12.4 mm in from the peripheral edge of the first cut. The samples were generated on an ARISTOMAT 1625 cutting table using a ARISTO knife Type 7132. The cutting speed of the machine was set to 500 mm/sec. The second cut was made through the top layer of PVB and the SRF but not through the bottom layer of PVB.

The cut trilaminates were then laminated into windshields. Eight windshields were made with the trilaminate material described above and three control windshields were made with PVB only. To make the laminates, one clear and one solar glass substrate, each 2.3 mm thick were used. The laminates were then prepared in a clean room. The laminates were de-aired using a vacuum ring process. The laminates were de-aired at room temperature for about 11 minutes, then passed through an oven (Quick Steel modified by Curvlite) set at approximately 149° C. for about 13 minutes. Through both the room temperature de-airing and the heated stage (oven), a vacuum of 0.81 bar was pulled. The set of laminates were placed into an autoclave (Scholz Maschinenbau GmbH & Co. KG) having a peak temperature of 143° C. and a peak pressure of 11.7 bar.

After the windshields were removed from the autoclave, each windshield was inspected for delamination.

TABLE 4

Rate of Delamination

| Windshield | Cutting | Rate of Delamination |
| --- | --- | --- |
| SUV-size with SRF | Slit in SRF 6.4–11.7 mm from glass edge | 0/8 |
| SUV-size, PVB only* | | 0/3 |

*Sample contained two 0.38 mm sheets of PVB and no SRF.

Example 5

Twenty SUV, twenty coupe, and twenty minivan windshields were generated with SRF that was coated with DuPont TYZOR™ TPT prime coating. The SRF had a shrinkage of 1.4% MD and 1.9% TD measured at 150° C., 15 minutes in air (based on ASTM D1204-94). These windshields were prepared using the following method:

Trilaminates of PVB/SRF/PVB were made using a Pro-Tech ORCA IV laminator (DeForest, Wis.). The PVB (SAFLEX AR11) was a sheet having a thickness of 0.38 mm. The SRF and PVB were nipped together at room temperature through two nips, one having a roll pressure of 6.9 bar and the other at 2.8 bar; the line speed was approximately 40 mm/sec.

The prelaminates were then cut to shape using a pneumatic swivel blade. A CAD file of each windshield was used to generate the cut pattern. The CAD file was adjusted so that the finished prelaminate would extend 3.2 mm beyond the edge of the glass. The pneumatic swivel blade cut samples were generated on an ARISTOMAT 1625 cutting table using an ARISTO knife Type 7132.

The cut prelaminates were then laminated into windshields using one clear and one solar glass substrate, each 2.3 mm thick. The laminates were prepared in a clean room. The windshields were de-aired using a vacuum ring process at room temperature for approximately 11 minutes, then passed through a tacking oven (Quick Steel modified by Curvlite) set at approximately 149° C. for 13–14 minutes. Through both the room temperature de-airing and tack stages, a vacuum of 0.83 bar was pulled. One set of laminates, consisting of half of each model type, was placed in an autoclave (Melco Steel Inc.) using a standard autoclave cycle: the peak temperature and pressure in the autoclave were 143° C., 11.7 bar. Another set of laminates (half of each model type) were autoclaved (Melco Steel Inc.) in a cycle where the maximum temperature and pressure were held at 127° C. and 11 bar. By the end of the hold period the temperature and pressure rose to 132° C. and 11.4 bar.

The tables below summarize the windshield lamination results, using the above-described autoclave cycles.

TABLE 5

Rate of Delamination (Samples w/Extension); Different Autoclave Settings

| Windshield | Extension (mm) | Cutting Method | Autoclave Cycle | Rate of Delamination |
| --- | --- | --- | --- | --- |
| SUV | +3.2 | Razor | 143° C., 11.7 bar | 0/10 |
| SUV | +3.2 | Razor | 132° C., 11.4 bar | 0/10 |
| Minivan | +3.2 | Razor | 143° C., 11.7 bar | 0/10 |
| Minivan | +3.2 | Razor | 132° C., 11.4 bar | 0/10 |
| Coupe | +3.2 | Razor | 143° C., 11.7 bar | 0/10 |
| Coupe | +3.2 | Razor | 132° C., 11.4 bar | 0/10 |

It was observed that by adding about a 3.2 mm extension and lowering the autoclave temperature limited the peripheral edge of the SRF from shrinking inside of the windshield, where the edge would be under stress. Table 6 shows the amount film pull-in or extension measured from the peripheral edge of the windshields.

TABLE 6

SRF Pull-in Using an Extension with an Alternative Autoclave Cycle

| Windshield | Autoclave Cycle | SRF Pull-in Upper & Lower Edges | SRF Pull-in Side Edges |
| --- | --- | --- | --- |
| SUV | 143° C., 11.7 bar | 2/10 0–1.78 mm pull-in | 5/10 0–2.54 mm pull-in |
| SUV | 132° C., 11.4 bar | 0/10 1.55–2.41 mm extension | 0/10 0.94–2.24 mm extensions |
| Minivan | 143° C., 11.7 bar | 4/10 0–1.55 mm pull-in | 1/10 0–1.35 mm pull-in |
| Minivan | 132° C., 11.4 bar | 0/10 1.42–2.13 mm extension | 0/10 1.65–2.49 mm extension |
| Coupe | 143° C., 11.7 bar | 10/10 1.42–2.54 mm pull-in | 0/10 0 mm pull-in |
| Coupe | 132° C., 11.4 bar | 0/10 0.74–1.91 extension | 0/10 1.12–2.74 mm extension |

Figure 10:
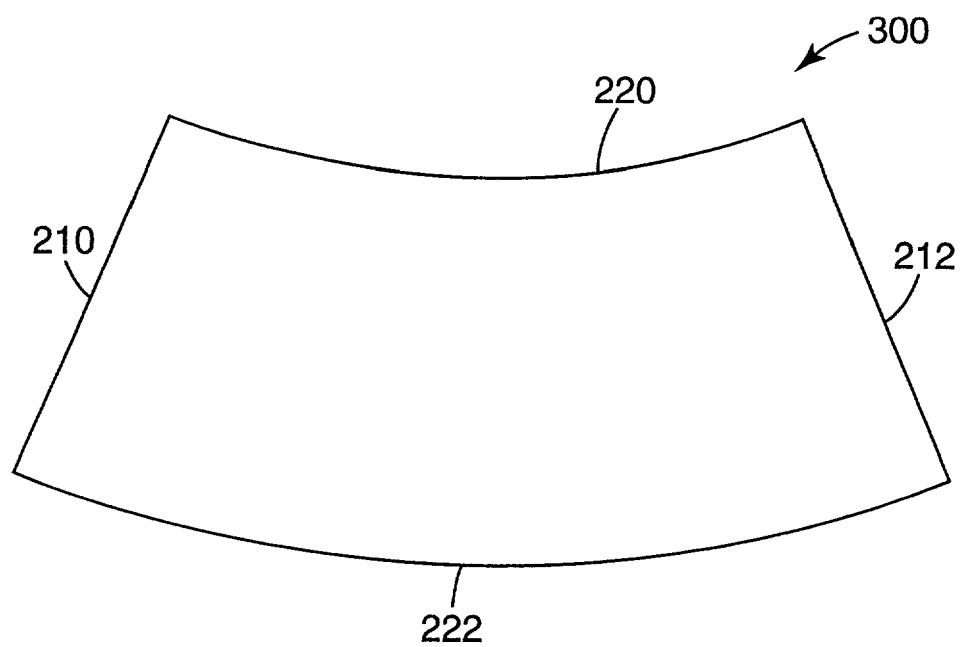
FIG. 10 is a plane view of one embodiment of a windshield according to the present invention.

The analysis of the data was used to determine the effect of the autoclave cycle, the windshield type and the interaction of the autoclave cycle and the windshield type on the amount of pull-in. It was found that the conditions under which the autoclave cycle is conducted as well as the windshield type affect the amount of pull-in (+)/extension (−) of the SRF on the sides of the windshield. The interaction between the variables was not significant for pull-in or extension of the SRF on the peripheral side edges 210 and 212 of the glazing components of windshield 300. See FIG. 10.

It was also observed that both the autoclave cycle and the windshield type affect the amount of pull-in (+)/extension (−) of the SRF on the upper peripheral edge 220 and lower peripheral edge 222 of the glazing components of windshield 300. The interaction between the autoclave cycle and windshield type was significant for pull-in or extension of the SRF on the upper and lower peripheral edges 220 and 222 of the glazing components of windshield 300.

Example 6

Twelve SUV windshields were prepared with Solar Reflecting Film. The SRF was coated with DuPont Tyzor TPT (tetraisopropyl titanate) primer. The SRF had a shrinkage of 1.4% MD and 1.9% TD measured at 150° C., 15 minutes in air (based on ASTM D1204-94).

Trilaminates (PVB/SRF/PVB) were made with SRF and 0.38 mm PVB (SAFLEX AR11) using a PROTECH PT45EGS laminator (DeForest, Wis.). In this prelamination process, the SRF and PVB were nipped together at room temperature with a roll pressure in the range of 0.55–0.69 bar and a line speed of 56 mm/sec.

The prelaminates were then cut to shape using either a laser or a pneumatic swivel dagger blade method. A CAD file of the vehicle's windshield was used to generate the cut pattern. The CAD file image was adjusted so that the finished prelaminate would extend 1.6 mm beyond the peripheral edge of the glass glazing component. The laser-cut samples were generated (Laser Machining Inc.; Somerset, Wis.) using a 500 J/s $CO_2$ laser at 25% power with the focus set at the top surface. The pneumatic swivel ARISTO blade type 7132 cut samples were generated on an ARISTOMAT 1625 table.

The cut pre-laminates were then laminated into windshields using one clear glass glazing component and one solar glass glazing component, each 2.3 mm thick. The laminates were prepared in a clean room. All the laminates were then deaired using a vacuum process. The laminates were de-aired at room temperature for approximately 11 minutes, then passed through a tack oven (Quick Steel modified by Curvlite) set approximately 149° C. for 13–14 minutes. Through both the room temperature de-airing and tack stages, a vacuum of 0.73 bar was pulled. The laminates were placed in an autoclave. The peak temperature and pressure of the autoclave was 143° C., 12.1 bar.

Tables 7 and 8 summarize the windshield lamination results of the observed edge defects. SRF Pull-in indicates the distance SRF pulls away from the center of the upper peripheral edge 220 of the glass glazing components of windshield 300. See FIG. 10. PVB pull-in indicates the distance PVB pulls away from the center of the upper peripheral edge 220 of the glass glazing components of windshield 300.

TABLE 7

SRF and PVB Pull-in for SUV Windshields with Laser Cut

| Laminate # | SRF Pull-in (mm) | PVB Pull-in (mm) |
| --- | --- | --- |
| 1 | 1.42 | 0 |
| 2 | 1.91 | 0 |
| 3 | 1.83 | 0 |
| 4 | 1.98 | 0 |
| 5 | 1.96 | 0 |
| 6 | 1.63 | 0 |

TABLE 8

SRF and PVB Pull-in for SUV Windshields Cut with Pneumatic Swivel Blade

| Laminate # | SRF Pull-in (mm) | PVB Pull-in (mm) |
| --- | --- | --- |
| 7 | 2.11 | 0 |
| 8 | 2.67 | 0 |
| 9 | 2.59 | 0 |
| 10 | 1.73 | 0 |
| 11 | 1.70 | 0 |
| 12 | 1.52 | 0 |

Example 7

Twenty-two SUV-sized windshields were made with Solar Reflecting Film that was treated with DuPont TYZOR TPT primer. The SRF had a shrinkage 1.4% MD and 1.9% TD measured at 150° C., 15 minutes in air (based on ASTM D1204-94).

Trilaminates (prelaminates of PVB/SRF/PVB) were made by laminating the SRF to 0.38 mm PVB (SAFLEX AR11) using a PROTECH ORCA IV laminator (DeForest, Wis.). The SRF and the bottom PVB were nipped together at room temperature with a roll pressure of 6.9 bar. The SRF and bottom PVB laminate were then nipped in a second lamination station to a top PVB layer with a roll pressure of 2.8 bar at room temperature.

The prelaminates were then cut to shape using a laser. A CAD file of the vehicle's windshield was used to generate the cut pattern. The CAD file image was adjusted so that the finished pre-laminate would extend 3.2 mm beyond the edge of the glass. The laser cut samples were generated using a 500 J/s $CO_2$ laser (Laser Machining Inc.; Somerset, Wis.) at 25% power with the focus set at the top surface.

The cut prelaminates were then made into windshields using one clear glass glazing component and one solar glass glazing component, each 2.3 mm thick. The laminates were prepared in a clean room. Comparative laminates were also made without pre-laminating the PVB/SRF/PVB. In this process, one sheet of PVB, then a sheet of SRF and a final sheet of PVB are placed over the inside glass glazing component. The outside glass glazing component was set over the composite and a hook blade is used to trim off the excess PVB and SRF using the glass edge as a guide. All the laminates were then de-aired using a vacuum ring process. The laminates were de-aired at room temperature for approximately 11 minutes, then passed through an oven (Quick Steel modified by Curvlite) set at approximately 149° C. for 13–14 minutes. Through both the room temperature de-airing and heated stages, a vacuum of 0.76 bar was pulled. The windshields were placed in an autoclave (Melco Steel Inc.). The peak temperature and pressure in the autoclave was 143° C., 12.1 bar.

The amount of pull-in of the SRF layer and the PVB was measured and tabulated in Table 9. SRF pull-in is the distance between the SRF and the peripheral edge of the glazing components.

TABLE 9

SRF and PVB Pull-in for SUV-sized Windshields Cut with Laser

| Laminate # | Maximum SRF Pull-in (mm) | Maximum PVB Pull-in (mm) |
| --- | --- | --- |
| 1 | 2.13 | 0 |
| 2 | 1.27 | 0 |
| 3 | 1.85 | 0 |
| 4 | 1.40 | 0 |
| 5 | 1.40 | 0 |
| 6 | 1.52 | 0 |
| 7 | 1.78 | 0 |
| 8 | 1.27 | 0 |
| 9 | 1.02 | 0 |
| 10 | 1.96 | 0 |
| 11 | 1.63 | 0 |
| 12 | 2.03 | 0 |

SRF Pull-in indicates the distance SRF pulls away from the peripheral edge of the glazing components (at point of maximum pull-in); PVB Pull-in: distance PVB pulls away from the peripheral edge of the glazing components (at point of maximum pull-in).

Comparative Examples for Example 7

For comparison, ten SUV-sized windshields were also prepared, but cut using the traditional trimming method. With this technique, the PVB/SRF/PVB composite is trimmed with a hook blade and the glass edge is used as a guide. The maximum amount of SRF and PVB material that retracted was measured and is tabulated in Table 10. SRF pull-in is the distance between the SRF and the peripheral edge of the glazing components.

TABLE 10

SRF and PVB Pull-in for SUV-sized Windshields Cut with Hook Blade

| Laminate # | Maximum SRF Pull-in (mm) | Maximum PVB Pull-in (mm) |
| --- | --- | --- |
| 1 | 3.18 | 3.18 |
| 2 | 3.18 | 3.18 |
| 3 | 3.68 | 3.68 |
| 4 | 3.18 | 3.18 |
| 5 | 3.43 | 3.43 |
| 6 | 3.35 | 3.35 |
| 7 | 3.45 | 3.45 |
| 8 | 3.10 | 3.10 |
| 9 | 3.56 | 3.56 |
| 10 | 3.63 | 3.63 |

SRF Pull-in indicates the distance SRF pulls away from the peripheral edge of the glazing components (at point of maximum pull-in); PVB Pull-in indicates the distance PVB pulls away from the peripheral edge of the glazing components (at point of maximum pull-in).

Using the data from Examples 6 and 7, a statistical analysis was completed. It was observed that increasing the length of the prelaminate extension, beyond the peripheral edge of the glass glazing components, decreases the amount the SRF pulls away from the glazing component peripheral edge. Although there is large variance in the amount of pull-in at different prelaminate extensions, each is a separate population. Linear regression also showed a correlation between the length of the pre-laminate extension and the amount of SRF pull-in. To eliminate SRF pull-in on the SUV-sized windshield, a minimum of approximately 4.8 mm of material may need to be added to the prelaminate extension. It was also found that adding a prelaminate extension beyond the peripheral edge of the glass glazing components also decreased the PVB pull-in from the glazing component peripheral edge. PVB pull-in at 1.6 mm and 3.2 mm pre-laminate extensions was not significantly different from one another. Linear regression showed that the PVB no longer pulls-in beyond the peripheral edge of the glass glazing components after 2.4 mm (3/32 in.) extension was added on the SUV-sized windshield.

TABLE 11

Rate of Delamination

| Laminates | Cutting Method | Rate of Delamination |
| --- | --- | --- |
| Example 7 | 3.2 mm extension | 0/10 |
| Comparative samples for Example 7 | Cut to glazing edge | 3/10 |

Table 11 indicates that windshields exhibiting pull-in of the PVB with pull-in of the SRF are more likely to exhibit delamination of the SRF than the windshields that do not exhibit such PVB pull-in.

A number of embodiments of the invention have been described. Nevertheless, it will be understood that various modifications may be made without departing from the spirit and scope of the invention. Accordingly, other embodiments are within the scope of the following claims.

What is claimed is:

1. A laminate comprising:
    a first bonding sheet having a major surface and a peripheral edge, said first bonding sheet being suitable for bonding to a glazing component having a major surface and a peripheral edge;
    a transparent optical sheet comprising a non-metallic birefringent multi-layer optical film, said transparent optical sheet having first and second major surfaces and a peripheral edge, said transparent optical sheet being positioned along the major surface of said first bonding sheet; and
    a transparent peripheral strip comprising a non-metallic birefringent multi-layer optical film that once formed an outer peripheral portion of said transparent optical sheet, said peripheral strip having a width and an inner peripheral edge, said peripheral strip being disposed beyond the peripheral edge of said optical sheet along the major surface of said first bonding sheet, and an inner peripheral edge of said peripheral strip and the peripheral edge of said optical sheet define a slit therebetween,
    wherein said optical film is dimensioned so as to be positionable substantially within the peripheral edge of the glazing component to which said optical sheet is to be adhered.

2. The laminate of claim 1 wherein the major surface of said optical sheet and the major surface of said first bonding sheet are at least partially bonded together such that a substantial portion of the peripheral edge of said optical film lies within the peripheral edge of said first bonding sheet.

3. The laminate of claim 1 wherein said slit is located a distance inward from the peripheral edge of the glazing component to which said optical sheet is to be adhered, said distance ranging from about 5 mm to about 15 mm.

4. The laminate of claim 1 further comprising:
    a second bonding sheet having a major surface and a peripheral edge, said second bonding sheet being suitable for bonding to a glazing component having a major surface and a peripheral edge, wherein said transparent optical sheet and said transparent peripheral strip are positioned between said first and second bonding sheets.

5. The laminate of claim 4 wherein said first and second bonding sheets extend to or beyond the peripheral edge of both glazing components to which said optical sheet is to be adhered, and said major surfaces of said first and second bonding sheets are continuous.

6. The laminate of claim 1 wherein said non-metallic optical film comprises a stack of 100 or more optical layers.

7. A laminate comprising:
    two bonding sheets, each bonding sheet having two major surfaces and a peripheral edge and being suitable for bonding to a transparent glazing component;
    a transparent optical sheet comprising a non-metallic birefringent multi-layer optical film, said transparent optical sheet having two major surfaces separated from one another by a peripheral edge, said optical film having a peripheral edge, said optical sheet being positioned adjacent to each of said bonding sheets such that said optical sheet is disposed between said bonding sheets, said bonding sheets being bondable between two glazing components; and two transparent glazing components, each glazing component having a major surface and a peripheral edge, wherein one major surface of one of said bonding sheets is bonded to the major surface of one of said glazing components and one major surface of the other of said bonding sheets is bonded to the major surface of the other of said glazing components, such that said optical sheet is positioned between said bonding sheets and said glazing components, and at least a substantial portion of the peripheral edge of said optical film is disposed so as to extend beyond the peripheral edge of at least one of said glazing components.

8. The laminate of claim 7 wherein most of the peripheral edge of said optical film is disposed so as to extend beyond the peripheral edge of at least one of said glazing components.

9. The laminate of claim 7 wherein all of the peripheral edge of said optical film extends beyond the peripheral edge of both of said glazing components.

10. The laminate of claim 7 wherein a portion of the peripheral edge of said optical film lies within the peripheral edge of at least one of said glazing components.

11. The laminate of claim 7 wherein said optical film is a film selected from the group consisting of infrared reflecting films, polarized films, non-polarized films, colored films, tinted films, and decorative films.

12. The laminate of claim 7 wherein the peripheral edges of the two bonding sheets extend substantially beyond the peripheral edge of at least one of the glazing components between which said optical sheet is to be adhered.

13. The laminate of claim 7 wherein the peripheral edges of the two bonding sheets extend substantially beyond the peripheral edge of both glazing components between which said optical sheet is to be adhered.

14. The laminate of claim 7 wherein said transparent optical sheet is dimensioned so that the peripheral edge of said optical film extends at least about 0.8 mm beyond the peripheral edge of at least one of the glazing components between which said optical sheet is to be adhered.

15. The laminate of claim 7 wherein said transparent optical sheet is dimensioned so that the peripheral edge of said optical film extends from about 0.8 mm to about 13 mm beyond the peripheral edge of at least one of the glazing components between which said optical sheet is to be adhered.

16. The laminate of claim 7 wherein said transparent optical sheet is dimensioned so that the peripheral edge of said optical film extends from about 0.8 mm to about 13 mm beyond the peripheral edge of both glazing components between which said optical sheet is to be adhered.

17. The laminate of claim 7 wherein said first and second bonding sheets extend to or beyond the peripheral edge of both glazing components, and said major surfaces of said first and second bonding sheets are continuous.

18. A laminate comprising:

a first bonding sheet having a major surface and a peripheral edge, said first bonding sheet being suitable for bonding to a glazing component having a major surface and a peripheral edge;

a second bonding sheet having a major surface and a peripheral edge, said second bonding sheet being suitable for bonding to a glazing component having a major surface and a peripheral edge; and a transparent optical sheet comprising a non-metallic birefringent multi-layer optical film, said transparent optical sheet having first and second major surfaces and a peripheral edge, said optical film having a peripheral edge, and the first and second major surfaces of said optical sheet and the major surface of each of said first and second bonding sheets being positioned together, wherein said optical film is dimensioned so as to be positionable substantially within the peripheral edge of each of said bonding sheets and the glazing component to which said optical sheet is to be adhered, and said transparent optical sheet is positioned between, and substantially within the peripheral edge of each of said bonding sheets so that portions of opposing major surfaces of said first and second bonding sheets, located adjacent their respective peripheral edge, extend beyond the peripheral edge of said optical film, face one another, and either have an unfilled space therebetween or contact one another.

19. The laminate of claim 18 wherein said optical film is dimensioned so as to be positionable completely within the peripheral edge of the glazing component to which said optical sheet is to be adhered.

20. The laminate of claim 18 wherein the first major surface of said optical sheet and the major surface of said first bonding sheet are at least partially bonded together such that a substantial portion of the peripheral edge of said optical film lies within the peripheral edge of said first bonding sheet, and wherein the second major surface of said optical sheet and the major surface of said second bonding sheet are at least partially bonded together such that a substantial portion of the peripheral edge of said optical film lies within the peripheral edge of said second bonding sheet.

21. The laminate of claim 18 wherein said optical film lies completely within the peripheral edge of said first bonding sheet and said second bonding sheet.

22. The laminate of claim 18 wherein at least one of said first bonding sheet and said second bonding sheet comprises a material selected from the group consisting of polyvinyl butyral, polyurethane, ionoplast and combinations thereof.

23. The laminate of claim 18 further comprising two transparent glazing components, each of said glazing components having a major surface and a peripheral edge, wherein each of said first bonding sheet and said second bonding sheet has another major surface that faces the major surface of one or the other of said glazing components such that said optical sheet is disposed between said first and second bonding sheets and said first and second bonding sheets are disposed between said glazing components such that the peripheral edge of said optical film is positioned substantially within the peripheral edge of at least one of said glazing components.

24. The laminate of claim 23 wherein said optical film is positioned completely within the peripheral edge of each of said glazing components.

25. The laminate of claim 23 wherein each of said first and second bonding sheets is fully bonded to its respective glazing component and said optical sheet.

26. The laminate of claim 23 wherein each of said first and second bonding sheets is bonded to its respective glazing component and said optical sheet, and at least one of said first and second bonding sheets is bonded to the peripheral edge of said optical sheet such that there are substantially no voids present adjacent the peripheral edge of said optical sheet.

27. The laminate of claim 23 wherein said two transparent glazing components comprise flat sheets.

28. The laminate of claim 18 wherein the major surface of said optical sheet and the major surface of said first bonding sheet are at least partially bonded together such that a substantial portion of the peripheral edge of said optical film lies within the peripheral edge of said first bonding sheet, said laminate further comprises a transparent peripheral strip comprising a non-metallic birefringent multi-layer optical film that once formed an outer peripheral portion of said optical sheet, said peripheral strip having a width and an inner peripheral edge, said peripheral strip being disposed beyond the peripheral edge of said optical sheet, and an inner peripheral edge of said peripheral strip and the peripheral edge of said optical sheet define a slit therebetween.

29. The laminate of claim 28 wherein said slit goes through said optical sheet and through one of said first bonding sheet and said second bonding sheet.

30. The laminate of claim 28 further comprising two transparent glazing components, each of said glazing components having a major surface and a peripheral edge, wherein each of said first bonding sheet and said second bonding sheet has another major surface that faces the major surface of one or the other of said glazing components such that said optical sheet and said peripheral strip are disposed between said first and second bonding sheets and said first and second bonding sheets are disposed between said glazing compounds.

31. The laminate of claim 30 wherein each of said first and second bonding sheets is fully bonded to its respective glazing component and said optical sheet.

32. The laminate of claim 28 wherein said slit is located a distance inward from the peripheral edge of the glazing component to which said optical sheet is to be adhered, said distance ranging from about 5 mm to about 15 mm.

33. The laminate of claim 32 further comprising two transparent glazing components, each of said glazing components having a major surface and a peripheral edge, wherein each of said first bonding sheet and said second bonding sheet has another major surface that faces the major surface of one or the other of said glazing components such that said optical sheet and said peripheral strip are disposed between said first and second bonding sheets and said first and second bonding sheets are disposed between said glazing components.

34. The laminate of claim 33 wherein each of said first and second bonding sheets is fully bonded to its respective glazing component and said optical sheet, wherein a portion of at least one of said first and second bonding sheets fills said slit.

35. The laminate of claim 18 wherein the peripheral edge of said optical film is a first peripheral edge and said optical film has a second peripheral edge located within the confines of the first peripheral edge, said second peripheral edge being in the form of at least one hole formed through said optical film.

36. The laminate of claim 18 wherein said optical film is a film selected from the group consisting of infrared reflecting films, polarized films, non-polarized films, colored films, tinted films, and decorative films.

37. The laminate of claim 18 wherein said major surfaces of said first and second bonding sheets are continuous.

38. The laminate of claim 18 wherein said non-metallic optical film comprises a stack of 100 or more optical layers.

39. A kit for making a laminate, said kit comprising:
a first bonding sheet having a major surface and a peripheral edge, said first bonding sheet being suitable for bonding to a glazing component having a major surface and a peripheral edge;
a second bonding sheet having a major surface and a peripheral edge, said second bonding sheet being suitable for bonding to a glazing component having a major surface and a peripheral edge; and
a transparent optical sheet comprising a non-metallic birefringent multi-layer optical film, said optical sheet having two major surfaces and a peripheral edge, said optical film having a peripheral edge, and said optical sheet being positionable between said first and second bonding sheet sheets,
wherein said optical film is dimensioned so as to extend beyond the peripheral edge of at least one glazing component to which said optical sheet is to be adhered.

40. The kit of claim 39 further comprising two transparent glazing components, each of said glazing components having a major surface and a peripheral edge, wherein each of said first bonding sheet and said second bonding sheet has another major surface that is positionable so as to face the major surface of one or the other of said glazing components such that said optical sheet can be disposed between said first and second bonding sheets and said first and second bonding sheets can be disposed between said glazing components.

41. The kit of claim 39 wherein said optical film is a film selected from the group consisting of infrared reflecting films, polarized films, non-polarized films, colored films, tinted films, and decorative films.

* * * * *

UNITED STATES PATENT AND TRADEMARK OFFICE
CERTIFICATE OF CORRECTION

PATENT NO. : 7,189,447 B2
APPLICATION NO. : 10/038642
DATED : March 13, 2007
INVENTOR(S) : Thomas J. Conway It is certified that error appears in the above-identified patent and that said Letters Patent is hereby corrected as shown below:

Page 2 Col. 2 (Foreign Patent Documents) – Line 3 - Before "0 978 736" delete "WO" and insert -- EP --, therefor.

Column 17 – Line 36 (Approx.) - Delete "Curvalite" and insert -- Curvlite --, therefor.

Column 21 – Line 25 (Approx.) - After "vacuum" insert -- ring --.

Column 21 – Line 28 (Approx.) - After "set" insert -- at --.

Column 27 – Line 28 - In Claim 30, delete "compounds" and insert -- components --, therefor.

Column 28 – Line 30 - In Claim 39, after "bonding" delete "sheet".

Signed and Sealed this

Thirty-first Day of July, 2007

JON W. DUDAS
*Director of the United States Patent and Trademark Office*